(12) United States Patent
Polka

(10) Patent No.: US 7,059,684 B1
(45) Date of Patent: Jun. 13, 2006

(54) ATTACHMENT FOR RETAINING A COVER TO THE WHEEL OF A TRUCK

(76) Inventor: John G. Polka, 1335 Margate, Libertyville, IL (US) 60048

( * ) Notice: Subject to any disclaimer, the term of this patent is extended or adjusted under 35 U.S.C. 154(b) by 30 days.

(21) Appl. No.: 10/802,561

(22) Filed: Mar. 17, 2004

(51) Int. Cl.
*B60B 7/06* (2006.01)

(52) U.S. Cl. .............................. 301/37.372; 301/37.371

(58) Field of Classification Search ........... 301/37.101, 301/37.102, 37.31, 37.34, 37.371, 37.372, 301/37.373, 37.374, 37.375, 37.376
See application file for complete search history.

(56) References Cited

U.S. PATENT DOCUMENTS

| 3,202,460 | A |   | 8/1965  | Holbrow |
|-----------|---|---|---------|---------|
| 3,833,266 | A | * | 9/1974  | Lamme ................... 301/37.21 |
| 4,133,583 | A | * | 1/1979  | Spisak ...................... 301/37.34 |
| 4,357,053 | A | * | 11/1982 | Spisak .................. 301/37.372 |
| 4,470,638 | A |   | 9/1984  | Bartylla |
| 5,042,881 | A |   | 8/1991  | Polka |
| 5,061,014 | A |   | 10/1991 | Polka |
| 5,358,313 | A |   | 10/1994 | Polka |
| 5,366,279 | A |   | 11/1994 | Polka |
| 5,443,582 | A | * | 8/1995  | Ching ................... 301/37.376 |
| 5,542,750 | A | * | 8/1996  | FitzGerald ............. 301/37.376 |
| 5,630,653 | A |   | 5/1997  | Polka |
| 5,645,324 | A |   | 7/1997  | Wright |
| 5,823,635 | A |   | 10/1998 | Polka |
| 5,853,228 | A | * | 12/1998 | Patti et al. ............. 301/37.371 |
| 5,876,099 | A |   | 3/1999  | Irgens-Moller |
| 6,238,007 | B1 | * | 5/2001 | Wieczorek et al. ...... 301/37.31 |
| 6,378,954 | B1 |   | 4/2002 | Polka |
| 6,402,254 | B1 | * | 6/2002 | Eikhoff et al. ......... 301/37.373 |
| 6,467,852 | B1 |   | 10/2002 | Polka |
| 6,585,330 | B1 | * | 7/2003 | Bruce ..................... 301/37.372 |
| 6,595,596 | B1 | * | 7/2003 | Polka .................... 301/37.102 |
| 6,682,151 | B1 | * | 1/2004 | Van Houten et al. ... 301/37.373 |
| 2005/0073192 | A1 | * | 4/2005 | Bruce et al. ........... 301/37.373 |

* cited by examiner

*Primary Examiner*—Russell D. Stormer
(74) *Attorney, Agent, or Firm*—Robert L. Marsh

(57) ABSTRACT

A cover is retained over the central portions of the wheel of a vehicle retained by a plurality of lug nuts by a retainer that attaches to two adjacent lug nuts. The retainer has first and second opposing retainer members with each retainer member having a pair of arcuate portions for fitting under the corners between flats of two adjacent lug nuts and against the tapered lower portion of the two lug nuts.

8 Claims, 10 Drawing Sheets

ATTACHMENT FOR RETAINING A COVER TO THE WHEEL OF A TRUCK

The present invention relates to a method of installing a decorative wheel cover to the wheel of a truck and in particular to a method that does not require the removal of the lug nuts retaining the wheel to the hub of the axle.

BACKGROUND OF THE INVENTION

It has become common for the owners of trucks to customize their trucks by providing decorative wheel covers to enhance the unattractive central portions of the wheels thereof. Trucks, however, are functional pieces of equipment and the manufacturers of trucks subordinate the physical appearance of the truck to the function. Manufacturers, therefore, do not provide wheel covers to improve the esthetic qualities of the wheels, nor do they provide attachment points for attaching such covers. Wheel covers are therefore provided by aftermarket manufacturers and wheel covers are attachable to the functional portions of the truck wheel.

Truck wheels are retained to the hub of the truck by a plurality of parallel threaded studs which extend from the hub through the web of a wheel and are retained thereon by a plurality of nuts. One method of attaching a cover across the central portion of a wheel is to provide an attachment device having holes therein for receiving the studs that attach the wheel to the hub such that the studs and lug nuts that retain the wheel to the hub also retain the wheel cover. Certain states, for example California, however, require that truck wheels be periodically inspected for cracks that incur in the vicinity of the holes that receive the studs that retain the wheel to the hub. Where portions of the web of the wheel are covered by the retainer for retaining a wheel cover, the retainer must be removed to inspect the web of the wheel in the proximity of the holes. The lug nuts that retain such wheels to the hub of a truck are installed using pneumatic or hydraulic tools and therefore the removal of a lug nut and the connector for attaching a wheel cover to expose the underlying web of the wheel would require the truck going off road to a remote location. The inspection of the wheels having a wheel cover with an attachment device that fits underneath the lug nuts can cause unacceptable delays in the use of the truck. It is therefore desirable to provide an attachment device for retaining a cover to a truck wheel without requiring the removal of the lug nuts.

One method of attaching a cover to a truck wheel is to provide a retainer with an attachment portion that wedges under a corner of the lug nut. My previously issued U.S. Pat. No. 5,630,653 issued May 20, 1997 discloses one device for attaching a wheel cover to a wheel, the device including an attachment plate with an arcuate portion sized to fit under the corners of a lug nut.

Wright, U.S. Pat. No. 5,645,324 discloses a device for use with a lug nut of the type having a cylindrical offset at the lower end thereof, the device including a connector plate having a pair of arcuate shaped portions sized to fit around the cylindrical lower end of the lug nut and below the corners thereof. The device of Wright, however, is not rigidly attached to the lug nuts and a wheel cover employing such an attachment may become detached from the truck wheel during use thereof.

SUMMARY OF THE INVENTION

Briefly, the present invention is embodied in a cover for the central portions of a wheel of a vehicle where the vehicle has a hub surrounded by a plurality of parallel spaced studs. The wheel attachable to the hub has a web with a plurality of holes therein for receiving the studs. Lug nuts threaded on each of the studs retain the wheel to the hub. The studs of such a hub have longitudinal axes with a fixed distance between the longitudinal axes of adjacent studs, and the lug nuts that are threaded onto the studs have a plurality of flats with a corner between adjacent flats, with corners defining a maximum radius for the lug nuts. The lower end of the lug nuts has a tapered portion that threads against a countersink in the wheel cover for retaining the wheel cover to the hub.

In accordance with the invention, a retainer for retaining a wheel cover has a first retainer member and a second retainer member with each of the first and second retainer members contacting two adjacent lug nuts retaining a wheel to a hub. One of the first and second retainer members has an arcuate portion with a radius that is less than the radius defined by the corners of the lug nut and is fitted against the tapered portion of a first of the lug nuts. One of the first and second retainers also has a arcuate portion with a radius less than the radius determined by the corners of the lug nut and is fitted against the tapered portion of the second of the lug nuts, and the first and second retainer members are rigidly retained to each other by a locking screw.

BRIEF DESCRIPTION OF THE DRAWINGS

A better understanding of the present invention will be had after a careful reading of the following detailed description taken in conjunction with the drawings wherein.

DETAILED DESCRIPTION OF A PREFERRED EMBODIMENT

Figure 1:
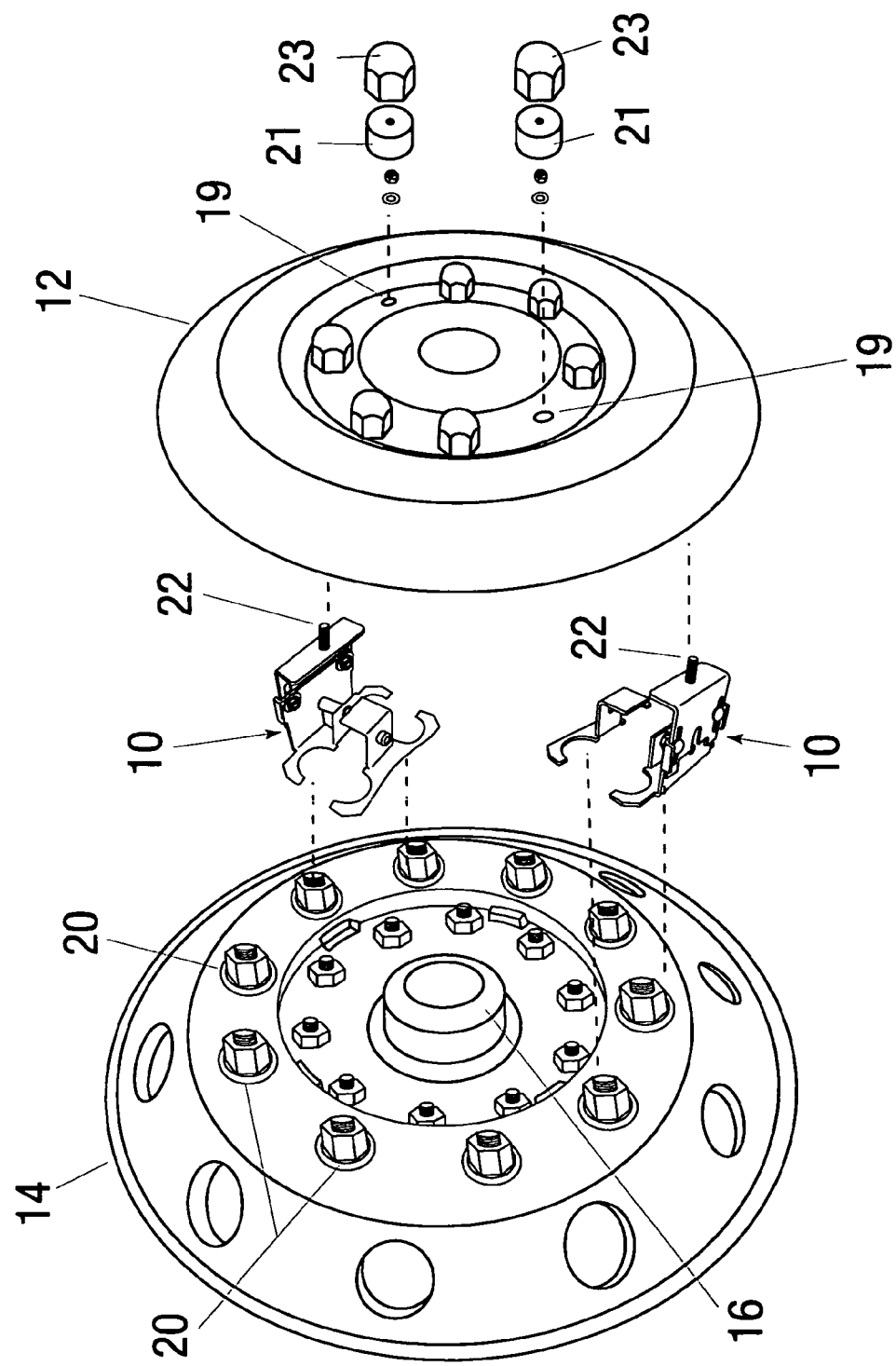
FIG. 1 is an exploded, isometric view of a wheel cover having an attachment device for attaching the wheel cover to a stud piloted truck wheel in accordance with the present invention.
Figure 2:
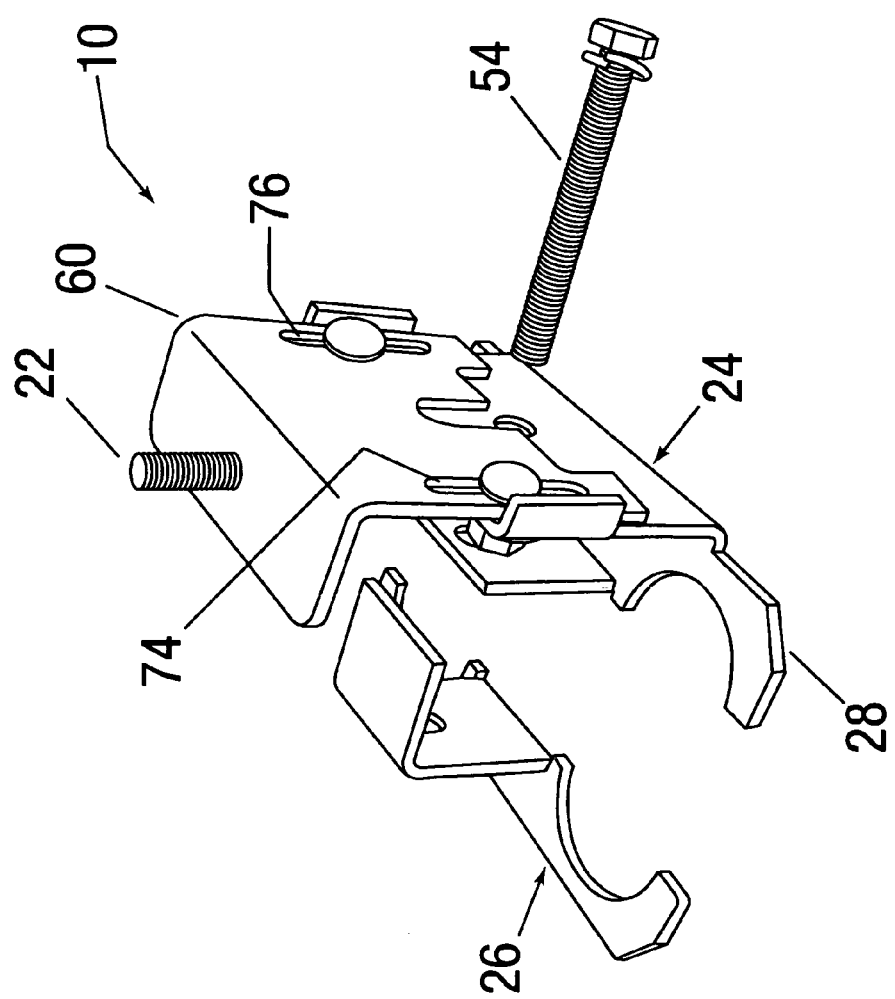
FIG. 2 is an enlarged, exploded, isometric view of one of the attachment devices shown in FIG. 1.
Figure 3:
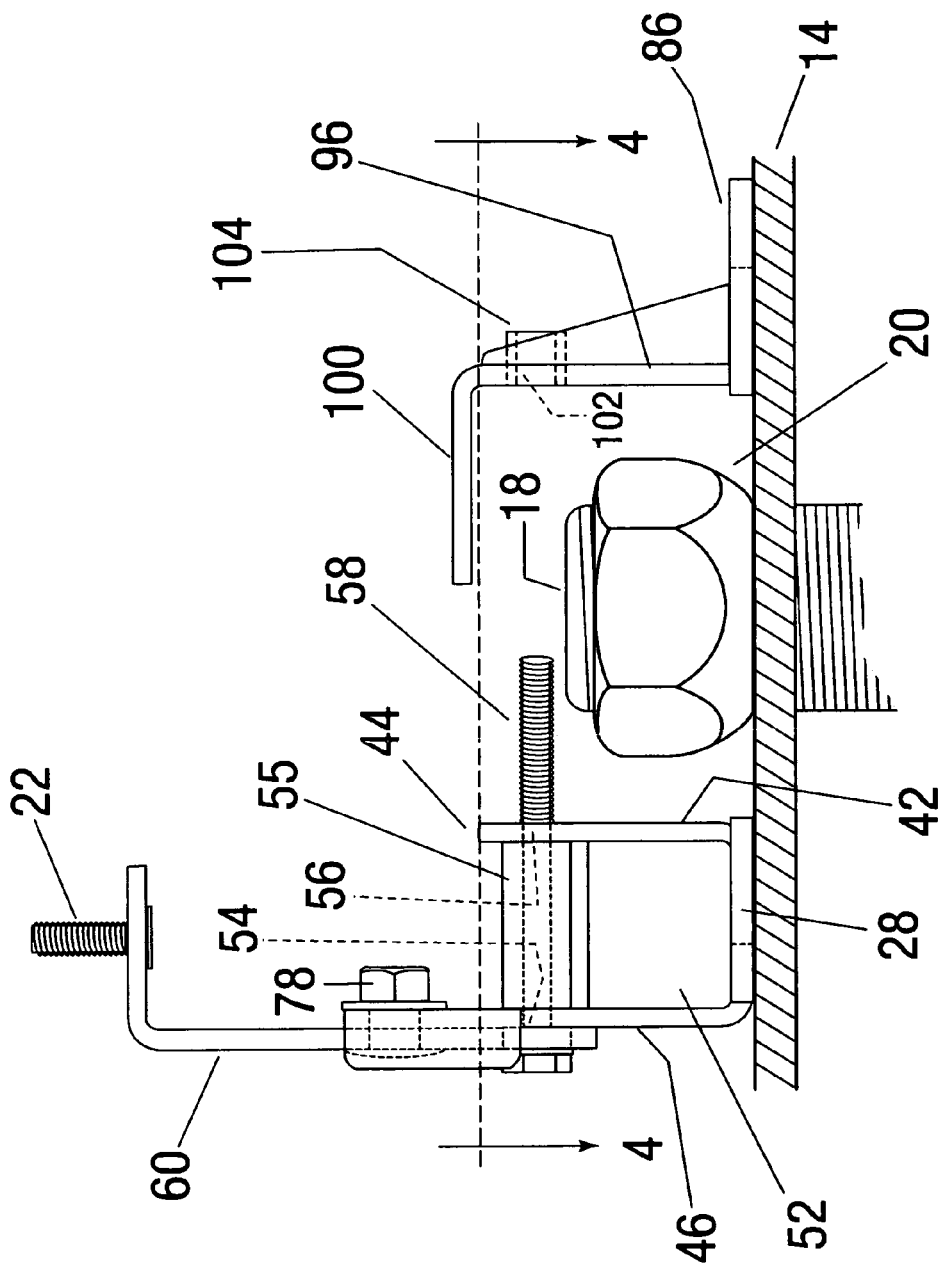
FIG. 3 is a further enlarged, exploded, side-elevational view of the attachment device shown in FIG. 2 positioned around a stud and nut retaining a wheel to an axle hub.
Figure 5:
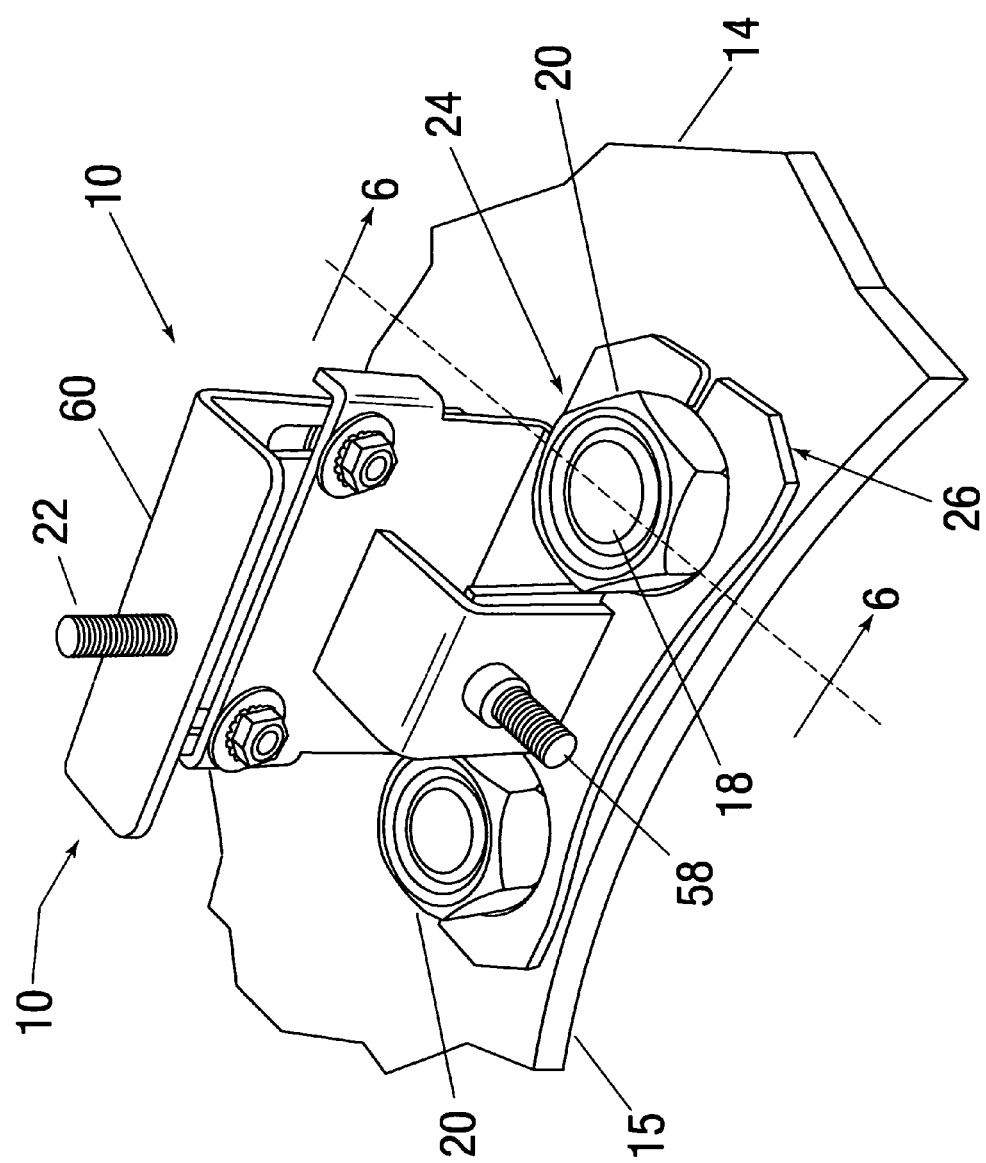
FIG. 5 is an isometric view of the attachment device shown in FIGS. 1 through 4 attached to a fragment of a wheel.
Figure 6:
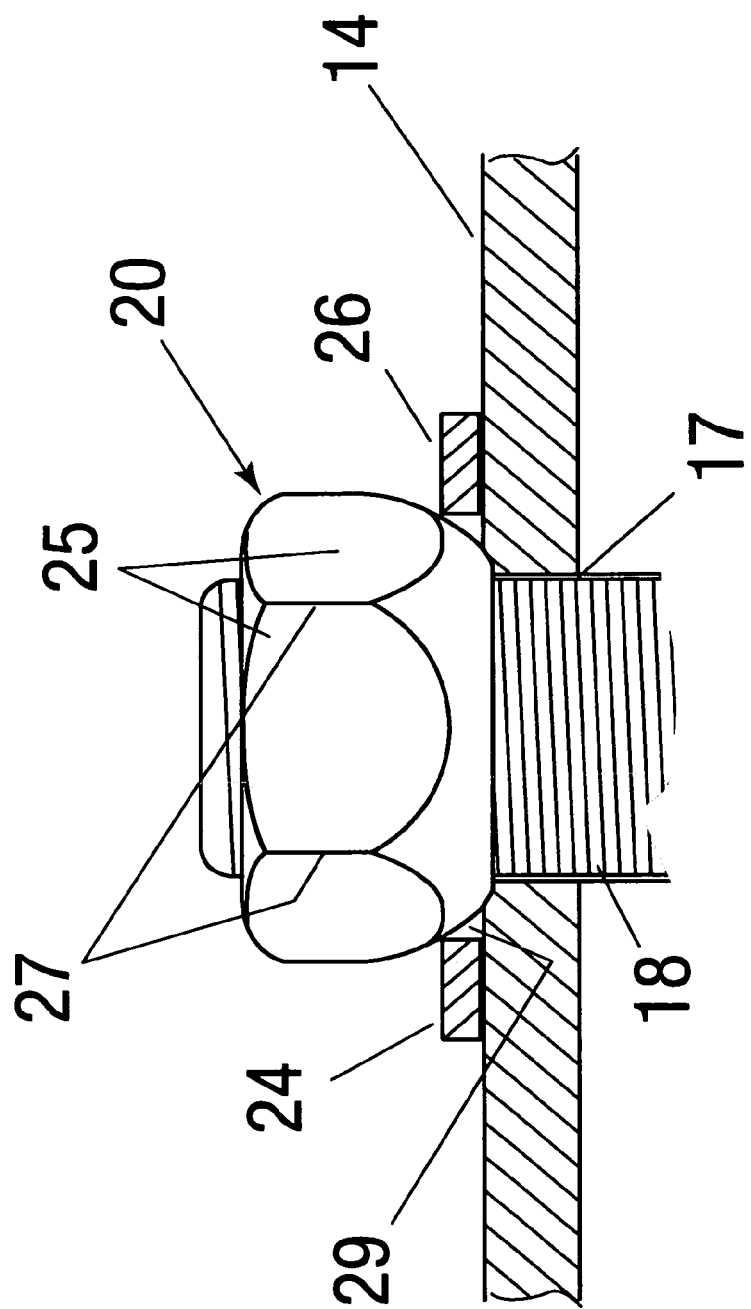
FIG. 6 is a further enlarged cross-sectional view of the attachment device shown in FIGS. 1 through 5 taken through line 6—6 of FIG. 5.

Referring to FIGS. 1, 5 and 6, the present invention is embodied in an attachment device 10 for attaching a wheel cover 12 to the outer surface of a truck wheel 14. The truck wheel 14 is mounted on a hub, the central portions 16 of which extend through a central opening in the wheel 14 and the hub has a plurality of parallel extending equally spaced threaded studs 18—18 surrounding the central portions 16 thereof. The wheel 14 has a central opening 15 through which the central portions 16 of the hub extend and a plurality of spaced holes, one of which 17 is shown in FIG. 6, for receiving the studs 18—18. Threaded on the distal end of each of the studs 18—18 is a lug nut 20—20.

At least two attachment devices spaced around the central opening of the truck wheel 14 are needed to retain the wheel cover 12 to the truck wheel 14. Each of the attachment devices 10 is adapted to attach to a pair of adjacent lug nuts 20 as is further described below and includes a suitable connector, depicted here as an outwardly extending threaded stud 22. The wheel cover 12 has two or more holes 19, with each hole 19 receiving one of the studs 22 of an attachment device 10 and the wheel cover 12 is retained thereon by nuts 21. A decorative covering 23 is fitted over each nut 21 and the end of the associated stud 22.

As best shown in FIG. 6, for stud piloted wheels, each lug nut 20 has a plurality of flats 25—25 with adjacent flats 25—25 separated by corners 27—27. At the end of the lug nut 20 that makes contact with the wheel 14 is a generally frustoconically shaped tapered portion 29.

Referring to FIGS. 2 through 7, the attachment device 10 includes a first connector portion 24 and a second connector portion 26, both of which are preferably made of shaped sheet metal. The first connector portion 24 has a first base plate 28 having spaced apart first and second long sides 30, 32 and outer ends 34, 36. One long side 30 has a pair of spaced arcuate indentations 38, 40 therein, with each of the arcuate indentations 38, 40 defining a fragment of a circle with the centers of the circles defined by the arcuate indentations 38, 40 spaced a distance apart equal to the distance between the axes of two adjacent studs 18—18. Connected along the portion of long side 30 between the spaced arcuate indentations 38, 40 is a generally rectangular guide plate 42 having a upper edge 44 parallel to the surface of the first base plate 28. Extending along the second long side 32 and perpendicular to the planar surface of the base plate 28 is a generally rectangular attachment plate 46 having parallel outer lips 48, 50 oriented perpendicular to the guide plate 42 and the attachment plate 46. A web 52 has one edge thereof welded to the guide plate 42, another edge welded to the attachment plate 46, and a third edge welded to the base plate 28 to maintain a rigid orientation of the members of the first connector portion 24. Extending through a first hole 54 in the attachment plate 46 through a spacer tube 55 and through an aligned second hole 56 in the guide plate 42 is a bolt 58 for adjustably retaining the first connector portion 24 to the second connector portion 26 as is further described below.

Slideably attachable along one surface of the attachment plate 46 is a generally rectangularly shaped second attachment plate 60. The second attachment plate 60 has parallel outer sides 62, 64 spaced apart a distance a little narrower than the distance between the parallel outer lips 48, 50 of the attachment plate 46 such that the second attachment plate 60 is slideable there between in a direction towards and away from the base portion 28. A pair of bolts 66, 68 extend through holes, not shown, in the attachment plate 46 and through aligned elongate slots 74, 76 to permit slideable motion of the second attachment plate 60 with respect to the first attachment plate 46. The parts are retained together in the desired orientation by tightening down nuts 78, 80 and suitable lock washers 82, 84 onto the bolts 66, 68. At the outermost end of the second attachment plate 60 is the outward extending connector stud 22.

The second connector portion 26 includes a second elongate base plate 86 having spaced apart long sides 88, 90. Long side 88 has spaced apart arcuate indentations, 92, 94 with each of the arcuate indentations defining a circle with the centers of the circles being spaced a distance apart equal to the spacing between adjacent axes of studs 18—18.

Between the arcuate indentations 92, 94 of long side 88 is a generally rectangular, perpendicularly extending attachment plate 96, and at the outer end of the attachment plate 96 is a guide plate 100 oriented parallel to the base plate 86 and extending outward of the first long side 88 and toward the first connector portion 24.

Extending through the attachment plate 96 is a hole 102 sized and positioned to receive the bolt 58. A nut 104 is welded to the attachment plate 96 with the aperture of the nut 104 aligned with the hole 102 such that the bolt 58 may be extended through the hole 102 and threaded into nut 104 thereby retaining the first connector portion 24 to the second connector portion 26. Also, the outer edge 44 of the guide plate 42 is adapted to slideable engage the lower surface of the guide plate 100 of the second connector portion 26 to thereby maintain a co-planar relationship between the surfaces of the first base plate 28 of the first connector portion 24 and the second base plate 86 of the second connector portion 26. As can be seen with the parts so oriented, the arcuate indentations 38, 92 of the first and second connector portions 24, 26 are shaped to encircle the tapered portion 29 of one lug nut 20 and the arcuate indentations 40, 94 of connector portions 24, 26 are adapted to encircle the tapered portion 29 of an adjacent second lug nut 20.

Figure 4:
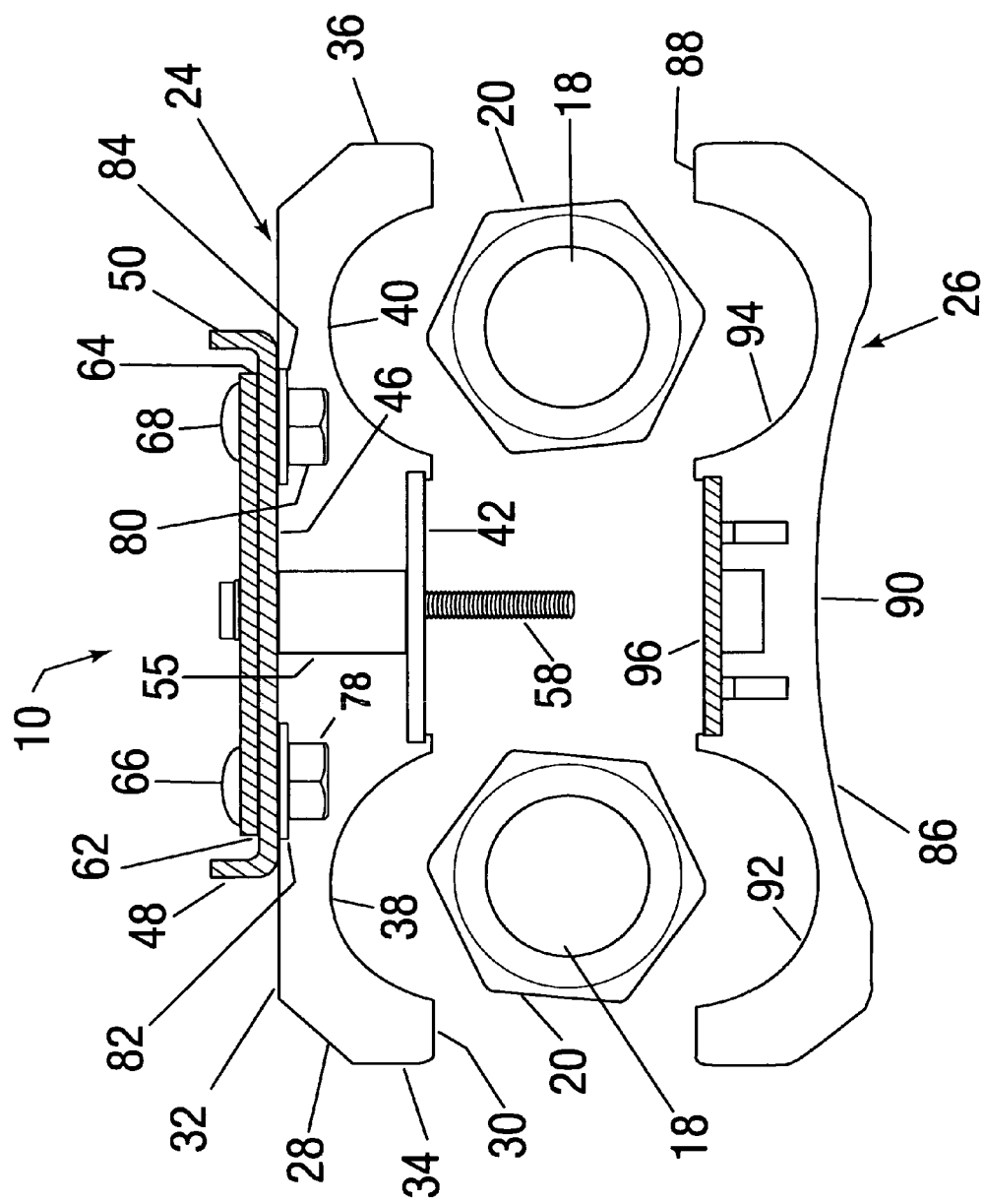
FIG. 4 is a second cross-sectional view of the exploded attachment device shown in FIG. 3 taken through line 4—4 thereof.

As best shown in FIGS. 4, 5, and 6, the arcuate portions 38, 40 of the first connector portion 24 are fitted around the tapered portions 29 of two adjacent lug nuts 20—20, and the arcuate portions 92, 93 of the second connector portion 26 are fitted around the opposite sides of the same two lug nuts 20—20 and the two connector portions 24, 26 are drawn together by tightening the bolt 58 into the nut 104. With the parts locked around the tapered portion 29 of adjacent nuts 20—20, the second attachment plate 60 can be longitudinally adjusted with respect to the first attachment plate 46, suitable for attaching to the wheel cover 12 after which the parts may be locked with respect to one another by tightening the bolts 66, 68 into their associated nuts 78, 80. Thereafter, the wheel cover 12 can be secured by nuts to the threaded stud 22. At least two devices 10 are needed to retain the wheel cover 12 across the wheel 14.

Figure 7:
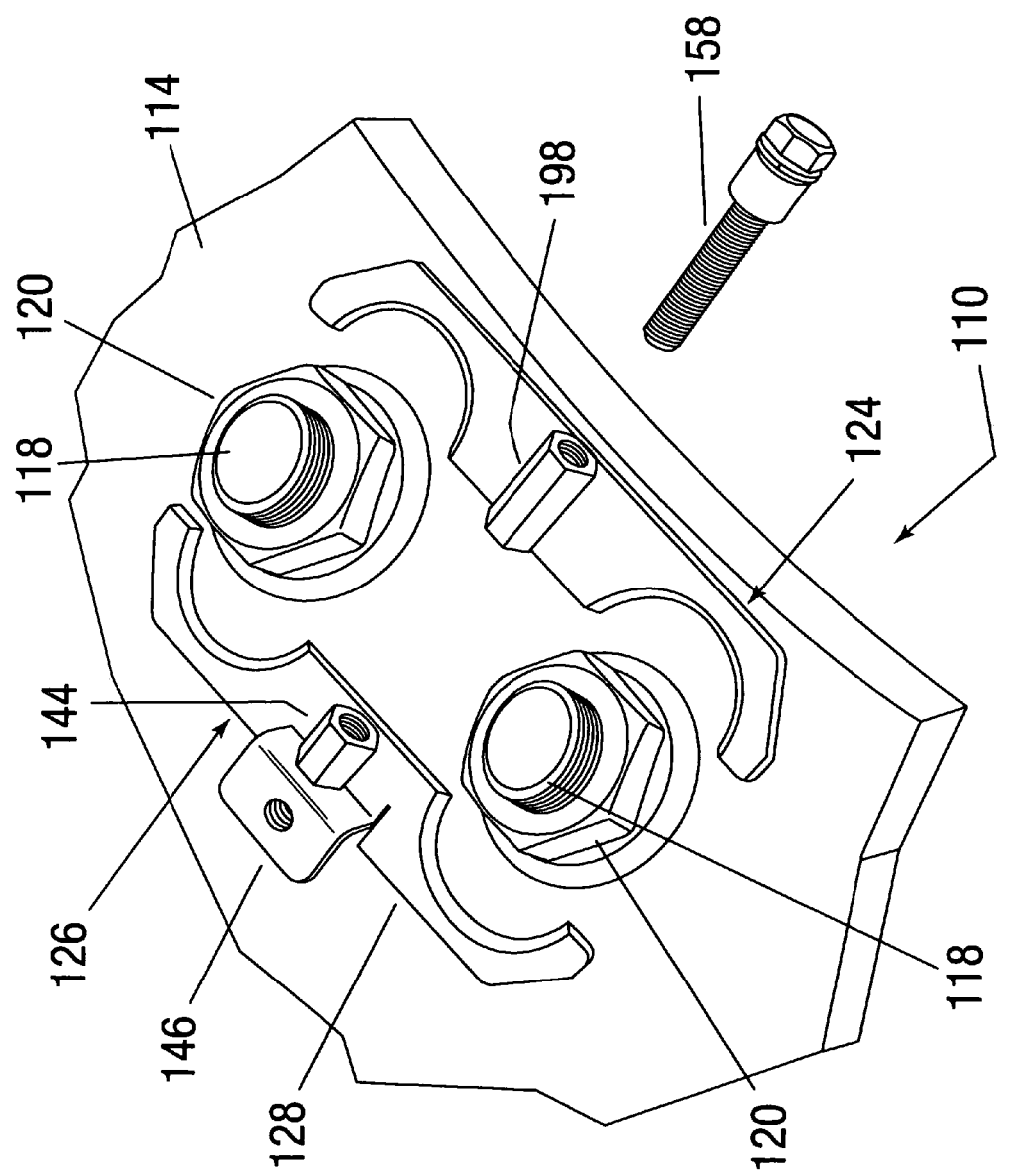
FIG. 7 is an exploded, isometric view of a second embodiment of an attachment device in accordance with the present invention for attaching a cover to a hub piloted wheel.
Figure 8:
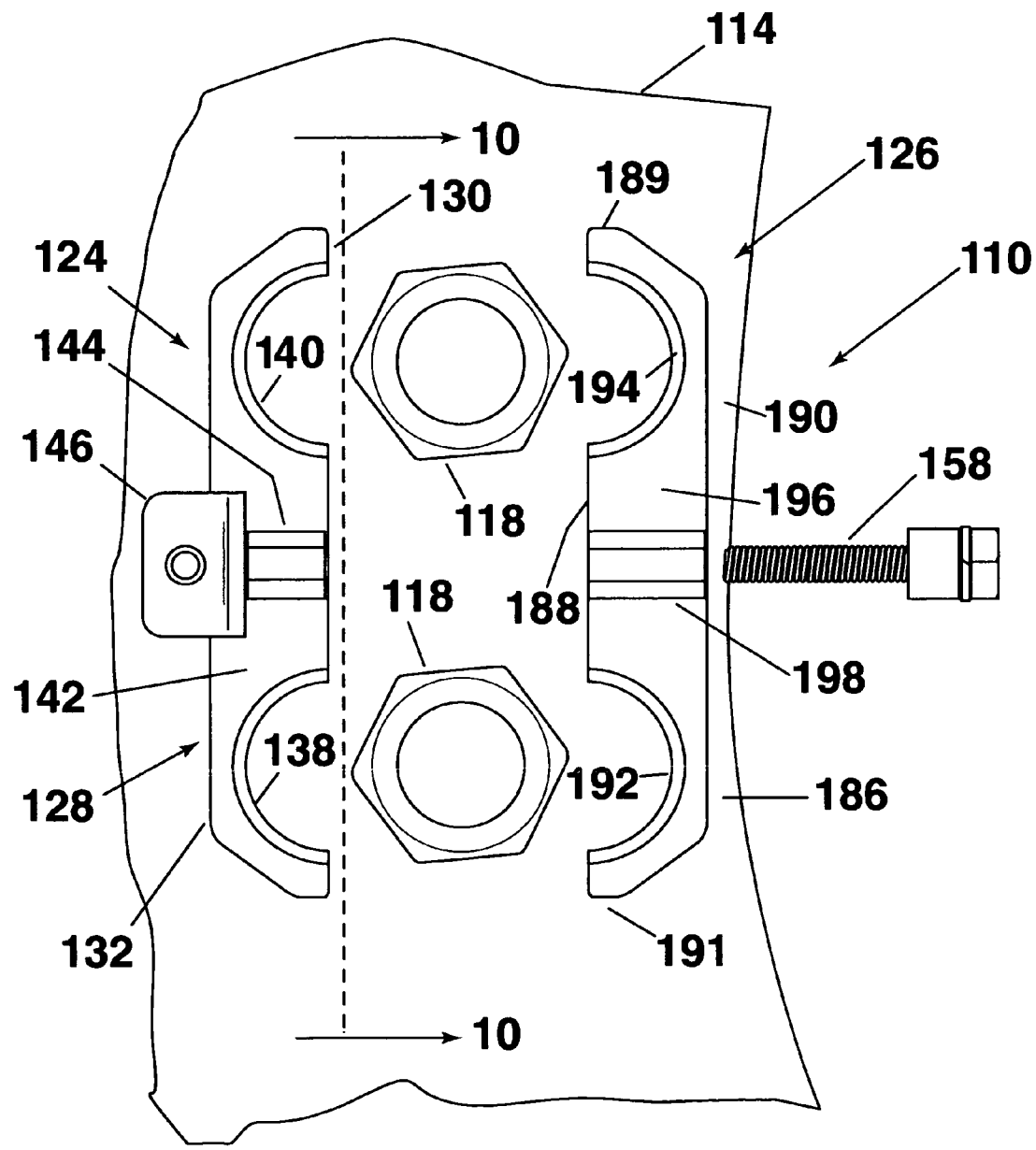
FIG. 8 is an exploded top view of the attachment device shown in FIG. 7.
Figure 9:
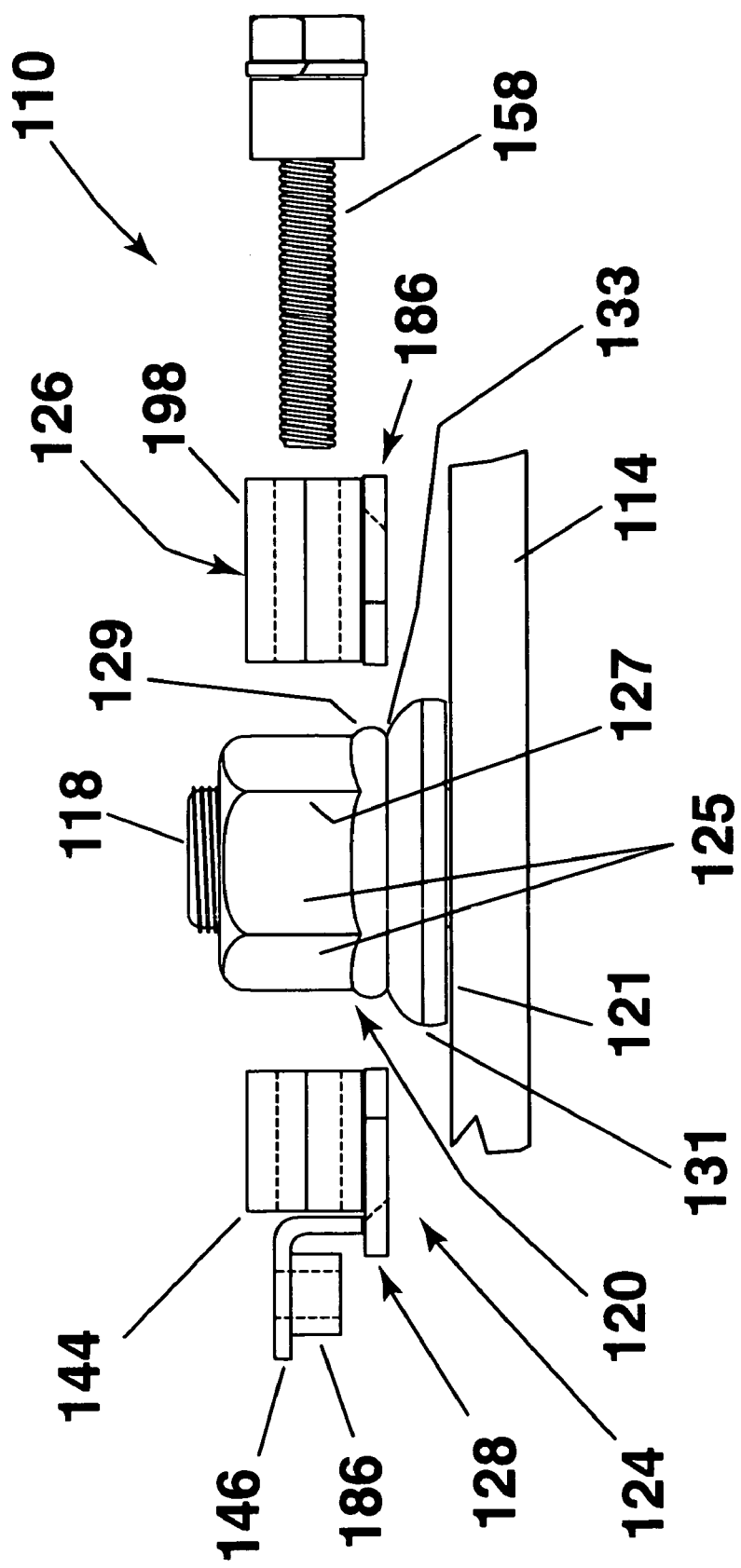
FIG. 9 is a side exploded view of the attachment device shown in FIG. 7.

Referring to FIGS. 7, 8, and 9, a second embodiment of the invention is suitable for attachment to the lug nuts of hub piloted wheels. For a hub piloted wheel, the accurate alignment of the wheel with respect to the hub is not determined by the placement of the studs, but by the central opening of the wheel fitting snugly around a hub. The diameters of the spaced holes positioned to receive the studs 118 are therefore larger than the diameters of the holes 117 through which they extend. The lug nuts 120, which retain the wheel 114 against the hub, have a planar rearward surface 121 rather than the tapered surface 19 of the lug nuts 20 used with stud piloted wheels. The lug nut 120 has a plurality of flats 125—125 with adjacent flats 125—125 separated by corners 127—127. Behind the flats 125—125 and corners 127—127 and forward of the planar surface 121 is a first annular bead 129, and behind the first annular bead 129 is a second annular bead 131. Between the first and second annular beads 129, 131 is an annular groove 133. A device 110 in accordance with the second embodiment of the invention is attachable to two adjacent lug nuts 120—120 by wedging a portion thereof into the annular grooves 133 of the adjacent studs as is further described below.

The device 110 has a first body member 124 and a second body member 126. The first body member 124 includes a first base plate 128 having spaced apart first and second long sides 130, 132 and outer ends 134, 136. One of the long sides 130 has a pair of arcuate indentations 138, 140 therein with each of the arcuate indentations 138, 140 defining a fragment of a circle with the centers of the circles spaced a distance apart equal to the distance between the axes of two adjacent studs 118, 118. The indentations 138, 140 are fragments of circles having diameters larger than that of the annular groove 133 and smaller than the maximum outer diameters of the first and second beads 129, 131. Welded to the upper surface 142 of the base plate 128 is an elongate threaded nut 144, the axis of which extends parallel to the upper surface 142 and perpendicular to the long sides 130, 132. Attached along long side 132 is a bracket 146 which retains a threaded nut 148 oriented with the axis thereof perpendicular to the upper surface 142. The nut 148 is adapted to receive a threaded bolt, not shown, for retaining a wheel cover, not shown, to the device 110.

The second body member 126 has a second base plate 186 having parallel spaced apart long sides 188, 190 and opposing short sides 189, 191. Long side 188 has spaced apart arcuate indentations 192, 194 with each of the arcuate indentations 192, 194 defining a circle with the centers of the circles being spaced a distance apart equal to the spacings between adjacent axes of studs 118—118. The arcuate indentations 192, 194 are fragments of the circle having a diameter which is larger than the inner diameter of the groove 133 and smaller than the maximum outer diameter of the annular beads 129, 131. Welded to the upper surface 196 of the second base plate 186 is a tubular member 198 having an inner diameter that is a little larger than the outermost diameter of the threads of a bolt 158 so as to be slideably received therein.

Figure 10:
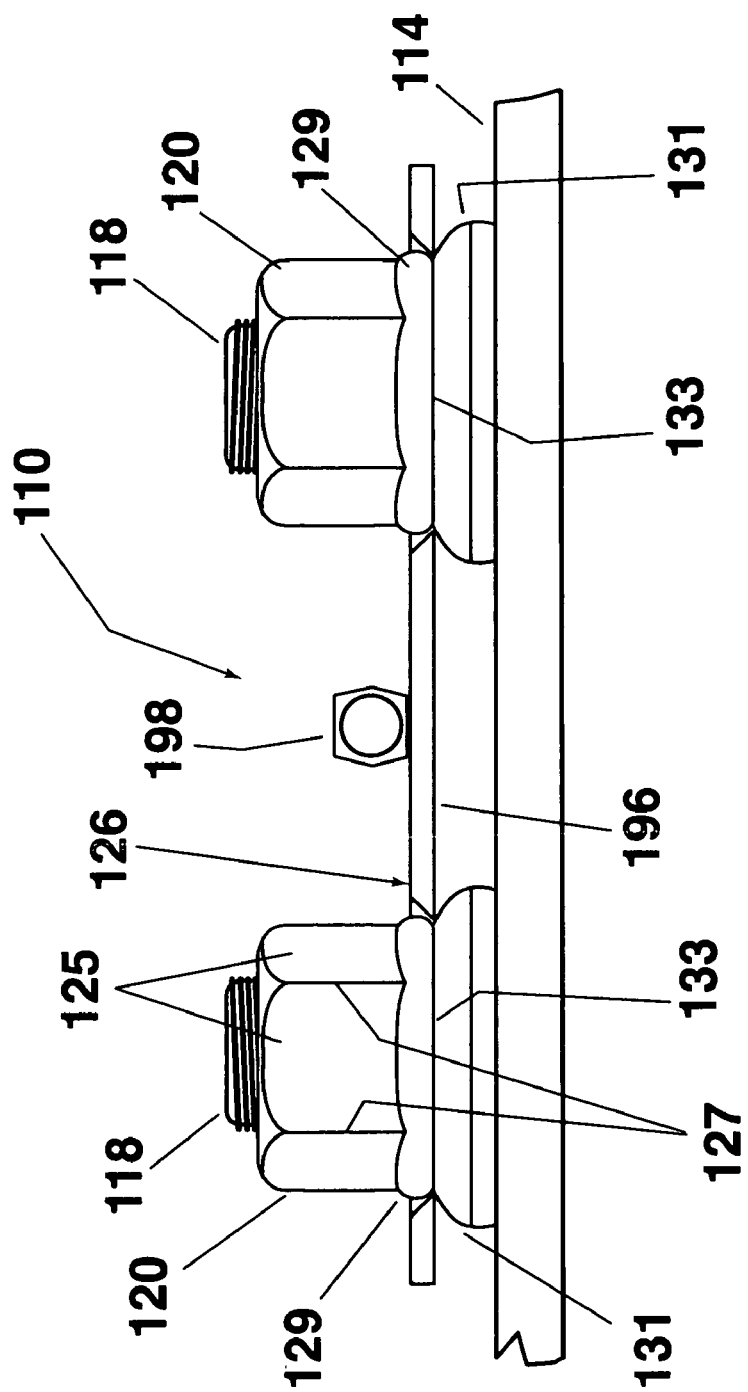
FIG. 10 is a side elevational view taken at line 10—10 of FIG. 8 of the attachment device shown in FIG. 7 connected to a pair of adjacent lug nuts.

As best shown in FIGS. 7, 9, and 10, the edges of the first and second base plates 126, 186 are beveled around the arcuate indentations 138, 140, 192, 194 such that the beveled arcuate portions 138, 140, 192, 194 will engage the annular grooves 133, 133 of adjacent lug nuts 120, 120. The first and second base plates 128, 186 are retained with the upper surfaces 142, 196 in co-planar relationship to each other and with their arcuate indentations locked around the annular grooves 133, 133 of adjacent lug nuts 120 by tightening the bolt 158 into the threaded nut 144. Once the first and second body members 124, 126 are attached to adjacent lug nuts 120, 120 a wheel cover having a bolt extending there through, not shown, can be threaded into the nut 148 to retain the wheel cover to the device 110.

While the present invention has been described with respect to two embodiments, it will be appreciated that many modifications and variations can be made without departing from the true spirit and scope of the invention. It is therefore the intent of the appended claims to cover all such modifications and variations which fall within the true spirit and scope of the invention.

What is claimed is:

1. A cover for covering a central portion of a wheel of a vehicle, said vehicle having a hub surrounded by a plurality of parallel spaced studs, said wheel having a web with a plurality of holes therein for receiving said studs and a lug nut threaded on each of said studs to retain said wheel to said hub, each of said studs having a longitudinal axis and there being a fixed distance between adjacent ones of said longitudinal axes, said lug nuts having a plurality of flats and a corner between adjacent ones of said flats, and said corners defining a maximum radius of said central portion of said lug nuts, said lug nuts each having a first end directed toward said wheel while said lug nut is threaded on one of said studs, said first end having a tapered surface, said cover comprising a first retainer member having a planar portion for contacting a first and a second adjacent ones of said lug nuts, said planar portion having a surface perpendicular to said axis while in contact with said lug nuts, a second retainer member having a planar portion for contacting said first and said second adjacent ones of said lug nuts, said planar portion having a surface perpendicular to said axis while in contact with said lug nuts, one of said first and second retainer members having a first indentation defining a shape for fitting against said tapered surface of said first lug nut and between said corners, and an outer surface of said wheel, one of said first and second retainer members having a second indentation defining a shape for fitting against said tapered surface of said second lug nut and between said corners and an outer surface of said wheel, and means for rigidly locking and unlocking said first retainer member to said second retainer member.

2. A cover in accordance with claim 1 wherein said means for rigidly locking and unlocking is a screw threaded into a nut.

3. A cover in accordance with claim 1 wherein said said first retainer member has first and second indentations with both said first and second indentations defining an arcuate shape and said first and second indentation are spaced apart a distance for fitting said arcuate shapes around said tapered surfaces of adjacent ones of said lug nuts, and said second retainer member has third and fourth indentations with both said third and fourth indentations defining an arcuate shape and said third and fourth indentations are spaced apart a distance for fitting said arcuate shapes around said tapered surfaces of said adjacent ones of said lug nuts.

4. A cover for covering a central portion of a wheel of a vehicle, said vehicle having a hub surrounded by a plurality of parallel spaced studs, said wheel having a web with a plurality of holes therein for receiving said studs and a lug nut threaded on each of said studs to retain said wheel to said hub, each of said studs having a longitudinal axis and there being a fixed distance between adjacent ones of said longitudinal axis, said lug nuts having a plurality of flats and a corner between adjacent ones of said flats, said corners defining a maximum radius of said central portion of said lug nuts, said lug nuts each having a first end directed toward said wheel while said lug nut is threaded on one of said studs, said first end having a tapered surface, said cover comprising a first retainer member having a planar portion for contacting a first and second adjacent ones of said lug nuts said planar portion having a surface perpendicular to said axis while in contact with said lug nuts, a second retainer member having a planar portion for contacting said first and said second adjacent ones of said lug nuts, said planar portion having a surface perpendicular to said axis while in contact with said lug nuts, said first and second retainer members each having a first arcuate shaped indentation for fitting against said tapered portion of said first lug nut and a second arcuate shaped indentation for fitting against said tapered portion of said second lug nut, and means for rigidly locking and unlocking said first retainer member to said second retainer member for retaining said indentations of said retainer members against said tapered portions of said lug nuts.

5. A cover in accordance with claim 4 wherein said means for rigidly locking and unlocking is a screw threaded into a nut.

6. A cover for covering a central portion of a hub piloted wheel of a vehicle, said vehicle having a hub surrounded by a plurality of parallel spaced studs, said wheel having a web with a plurality of holes therein for receiving said studs and a lug nut threaded on each of said studs to retain said wheel to said hub, each of said studs having a longitudinal axis and there being a fixed distance between adjacent ones of said longitudinal axes, said lug nuts having a plurality of flats and a corner between adjacent ones of said flats, and having a first end directed toward said wheel while said lug nut is threaded on one of said studs, said first end having a first annular bead having a first maximum radius, a second annular bead spaced from said first annular bead and having a second maximum radius, and a groove between said first annular bead and said second annular bead, said cover comprising a first generally planar retainer member for contacting a first and a second adjacent ones of said lug nuts while said generally planar member is perpendicular to said axis, a second generally planar retainer member for contacting said first and said second adjacent ones of said lug nuts while said generally planar member is perpendicular to said axis, one of said first and second retainer members having a first arcuate indentation for fitting in said groove of said first of said adjacent lug nuts, one of said first and second retainer members having a second indentation for fitting in said groove of said second of said adjacent lug nuts, and means for fixedly retaining said first retainer member to said second retainer member with said first indentation in said groove of said first lug nut and said second indentation in said groove of said second lug nut.

7. A cover in accordance with claim 6 wherein said means for rigidly retaining is a screw threaded into a nut.

8. A cover for covering a central portion of a hub piloted wheel of a vehicle, said vehicle having a hub surrounded by a plurality of parallel spaced studs, said wheel having a web with a plurality of holes therein for receiving said studs and a lug nut threaded on each of said studs to retain said wheel to said hub, each of said studs having a longitudinal axis and there being a fixed distance between adjacent ones of said longitudinal axis, said lug nuts having a plurality of flats and a corner between adjacent ones of said flats, and having a first end directed toward said wheel while said lug nut is threaded on one of said studs, said first end having a first annular bead having a first maximum radius, a second annular bead and spaced from said first annular bead and having a second maximum radius, and a groove between said first annular bead and said second annular bead, said groove having a radius less than said first maximum radius said second maximum radius, said cover comprising a retainer member having a planar portion with an arcuate indentation for fitting in said groove of one of said lug nuts, said planar portion having a surface perpendicular to said axis while said arcuate indentation is fitted in said grove, and means for rigidly retaining said retainer member with said indentation against said groove.

\* \* \* \* \*